July 12, 1955
E. G. HJÄRPE
2,712,795
PNEUMATIC-HYDRAULIC PRESSURE DEVICE
Filed Feb. 8, 1954
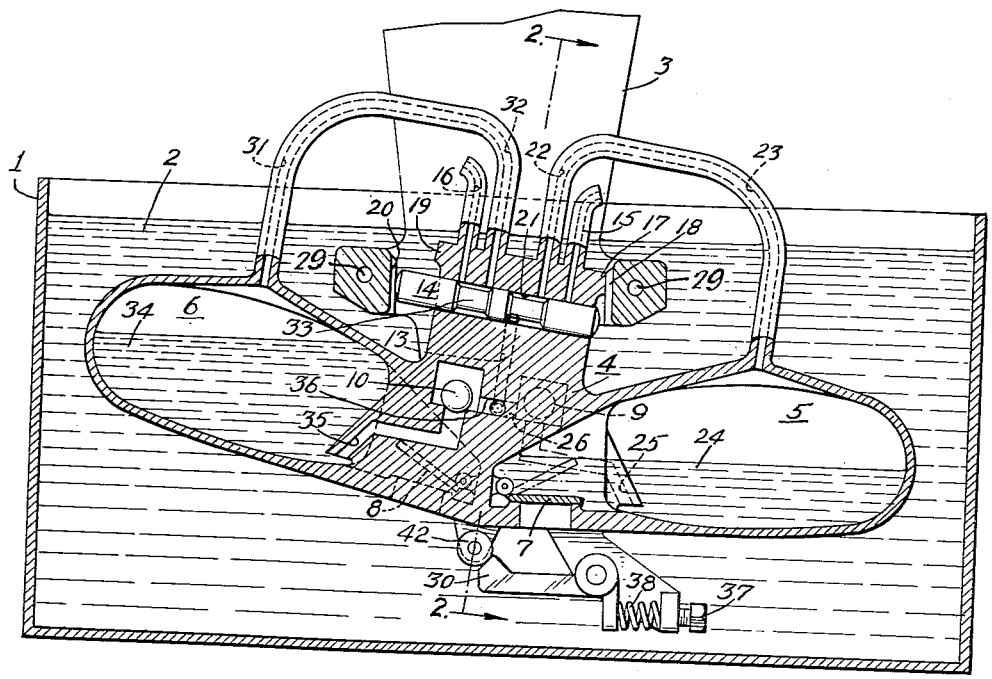
FIG. 1.
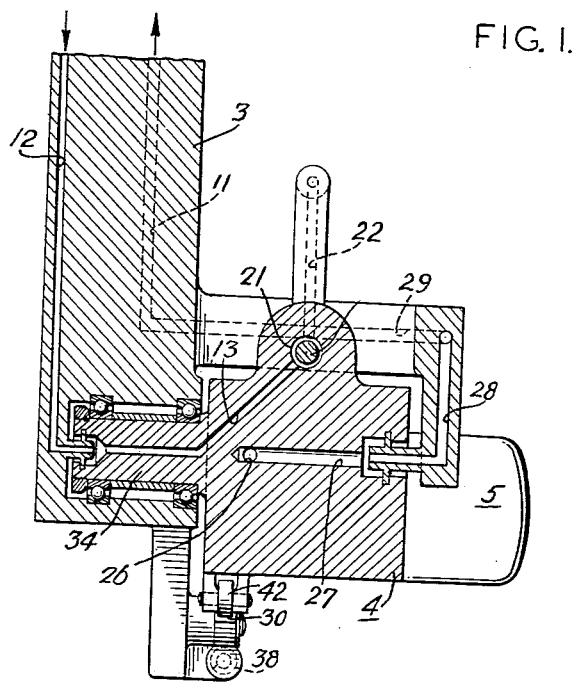
FIG. 2.
FIG. 3.
FIG. 4.
INVENTOR
ERIC GEORG HJÄRPE
BY HIS ATTORNEYS
Howson & Howson United States Patent Office 2,712,795
Patented July 12, 1955

2,712,795

PNEUMATIC-HYDRAULIC PRESSURE DEVICE

Eric Georg Hjärpe, Goteborg, Sweden, assignor to Aktiebolaget Svenska Kullagerfabriken, Goteborg, Sweden, a corporation of Sweden Application February 8, 1954, Serial No. 408,957

1 Claim. (Cl. 103—238)

Because of the considerable advantages provided by hydraulic drive, this form of power transmission has more and more come into use in connection with various types of machine constructions. The present invention relates to a pneumatic-hydraulic pressure device, comprising a pair of movable chambers adapted to be submerged in a fluid and having a valve mechanism for putting the chambers into alternate communication with an air pressure line, the said chambers being provided with inlets and outlets for fluid, and being so arranged, that they alternately deliver fluid to an outlet under the pressure of the air. The purpose of the invention is to provide a device of this description which delivers a continuous and even flow of fluid at a constant pressure to the outlet, and thereby makes the device suitable for use for example in connection with hydraulically driven machine tools. The invention is characterized mainly thereby that the valve mechanism is so constituted that when changing over from one chamber to the other, both chambers are momentarily in communication with the air pressure line, and that the outlets of both chambers are simultaneously open.

One form of the invention is illustrated in the accompanying drawing in which Fig. 1 shows diagrammatically a section through the device in one of its end positions and Fig. 2 shows a section along the line II—II in Fig. 1. Figures 3 and 4 show different positions of the piston valve for distributing the pressure air to the chambers.

In a container 1, containing a fluid 2, is provided a bearing housing 3, in which is carried a valve housing 4 to which are connected two chambers 5 and 6. These chambers are provided with a valve 7 and 8 respectively through which fluid can be admitted to the chambers from the container 1. The outlets from the chambers are governed by one way valves which, as illustrated, may be ball valves 9 and 10, past which the fluid can leave the chambers through a system of channels as described in the following and pass to the outgoing pressure line 11 which leads to a machine to be driven by the pressure fluid.

Air under pressure is delivered from an air pressure line through a channel 12 in the bearing housing 3, and further through a channel 13 in the valve housing 4 to a piston valve 14, where it is distributed to one or the other of the chambers 5 or 6. That one of the chambers 5 or 6 which for the time being is not in communication with the air pressure channel 13 through the valve 14, is instead in communication with the atmosphere through a channel 15 or 16, and a system of channels as described in the following.

The bearing housing 3 is provided with an extension upon which is carried a cam 30, which is loaded by a spring 38 and which cooperates with a roller 42 on the valve housing 4, and thereby strives to retain the valve housing in the position shown in which an abutment 17 is brought into engagement with another abutment 18 on the bearing housing. In this manner a certain turning moment is required to cause the device to turn from the end position shown in the figure to its other end position, where another abutment 19 on the valve housing engages an abutment 20 on the bearing housing.

If it is assumed that air at a certain required pressure is led to the device in the position shown in Fig. 1 through channels 12 and 13, the air will continue through the valve chamber 21, channels 22 and 23 to the chamber 5 and exert pressure on the free surface of the fluid in the chamber, whereby this fluid 24 will be forced through the channels 25, past the ball valve 9, and further through channels 26, 27, 28 and 29 to the outlet 11.

As the fluid is forced from the chamber 5 by the air pressure, this chamber will become more and more buoyant and will tend to rise in the fluid 2 and thereby exert a turning moment on the valve housing carried on the bearing housing 3. In the position shown, this turning moment will tend to turn the valve housing counter-clockwise, and will finally reach such a magnitude that it overcomes the moment exerted in the opposite direction by the cam 30.

During the period when the chamber 5 is being emptied, the chamber 6 has been in communication with the atmosphere through channels 31 and 32, the valve 33 and channels 16. The fluid from the container 1, thus enters the chamber 6, through the valve 8 and completely fills the chamber.

When, because of the buoyancy of the chamber 5, the whole system turns about the journal 34 to its other end position, in which the abutment 19 engages the abutment 20, the valve 14 which is located so, that it is actuated by abutments 18 and 20, is displaced to another position relative to the channels 16, 32, 13, 22 and 15, as shown in Fig. 3.

In the new position of the piston valve, the chamber 6 is in communication with the air pressure channels 13 and 12 through channels 31 and 32 and the valve chamber 33. Further the chamber 5 is in communication with the atmosphere through the channels 23 and 22, the valve chamber 21 and the channel 15. The air pressure now acts upon the free surface of the fluid in the chamber 6 and forces the fluid 34 out through the channel 35 past the ball valve 10 and further through the channels 36, 27, 28 and 29 to the outlet line 11.

During this time the chamber 5 is filled with fluid entering past the valve 7. When the chamber 6 has been sufficiently emptied so that its buoyancy becomes great enough to overcome the moment exerted by the cam 30 in the opposite direction, the system turns clockwise to its original position, the valve 14 is reversed and the abutment 17 engages the abutment 18 after which the cycle is repeated.

The period of the cycle depends on how quickly the chambers 5 and 6 are emptied, or in other words, on the volume of fluid removed from the pressure line 11 per unit of time.

The channels 16, 13 and 22 and 15, 13 and 32 respectively are so located relative each other and the piston valve so made that the chambers 5 and 6 are never simultaneously completely cut off from the air pressure channel. As shown in Figures 3 and 4, the mouth of the channel 13 is beveled to a width somewhat greater than the width of the central portion of the piston valve 14, and the channel 13 thus is never completely closed. When the system during the course of a turning movement reaches its central position both chambers 21 and 33 of the piston valve and both chambers 5 and 6 are thus in communication with the air pressure line 13 (see Fig. 4), whereby momentary drops in pressure are avoided in the outlet pressure line 11 during the turning movement.

During the latter half of the turning movement, the air flowing out through the channels 15 and 16 respectively from chambers 5 and 6 will cause a reaction to be set up resulting in a turning moment, which is added to the moment caused by the buoyancy of the chambers. The pressure of the cam 30 against the roller 42 also assists the turning movement during its latter part.

With the device as above described, it is possible to remove a required quantity of fluid per unit of time at a constant pressure through the pressure line 11. The volume of pressure air used is thus always equal to the volume of the fluid removed from the system.

By providing the device with a counter or the like, it can be made suitable for measuring fluids.

By means of an adjusting screw 37, the tension of the spring 38 may be adjusted to cause the system to turn at any desired time, while emptying the chambers 5 and 6. The greater the tension of the spring 38, the greater must be the buoyancy of the chambers before they are able to overcome the resistance of the cam 30.

The air pressure line can be provided with a reducing valve so that the pressure of the incoming air can be governed. The pressure of the fluid will then automatically be altered to correspond in all cases to the air pressure.

I claim:

A pneumatic-hydraulic pressure device comprising a movable casing adapted to be submerged in a fluid and having a pair of chambers, each of said chambers having an inlet and an outlet port for said fluid and valve devices for controlling the flow through said ports, a vent for each chamber, an air pressure line, valve means movable between alternative positions and operative in one of said positions to connect one of said chambers to the air line and to close the vent of the chamber so connected, and to simultaneously disconnect the other chamber from said line, and to open the vent of the latter chamber, thereby to effect discharge of contained fluid from the first chamber while permitting fluid to enter the second chamber, said casing being also movable between alternative positions in response to variations in the relative buoyancies of the chambers resulting from said simultaneous discharges and admissions of the fluid, means providing for momentary simultaneous connection of the chambers to the air line when the valve means occupies an intermediate position in its movement from one of said alternative positions to the other, and means responsive to the movements of the casing for shifting the valve means from one of said alternative positions to the other.

References Cited in the file of this patent

UNITED STATES PATENTS

| | | |
|---|---|---|
| 461,192 | Merrill | Oct. 13, 1891 |
| 1,845,139 | Exley | Feb. 16, 1932 |